United States Patent [19]

Watanabe et al.

[11] Patent Number: 5,202,104
[45] Date of Patent: Apr. 13, 1993

[54] PROCESS FOR PREPARING SILICA HAVING A LOW SILANOL CONTENT

[75] Inventors: Naotake Watanabe, Yokosuka; Koichi Orii, Yokohama; Junsuke Yagi, Yokohama; Iwao Ohshima, Yokohama, all of Japan

[73] Assignee: Nitto Chemical Industry Co., Ltd., Tokyo, Japan

[21] Appl. No.: 481,235

[22] Filed: Feb. 20, 1990

[30] Foreign Application Priority Data

Feb. 20, 1989 [JP] Japan .................................. 1-038168

[51] Int. Cl.$^5$ .............................................. C01B 33/12
[52] U.S. Cl. .................................... 423/335; 423/325; 423/340; 156/DIG. 64
[58] Field of Search .................... 423/335, 340, 325; 150/DIG. 64

[56] References Cited

U.S. PATENT DOCUMENTS

| 3,859,420 | 1/1975 | Laufer et al. | 423/335 |
| 4,683,128 | 7/1987 | Orii et al. | 423/339 |

FOREIGN PATENT DOCUMENTS

| 0206353 | 12/1986 | European Pat. Off. | 423/335 |
| 0283933 | 9/1988 | European Pat. Off. | 423/335 |
| 352027 | 1/1990 | European Pat. Off. | 423/335 |
| 2225452 | 9/1974 | Fed. Rep. of Germany | 423/335 |
| 160961 | 7/1984 | German Democratic Rep. | 423/335 |
| 56-28852 | 7/1981 | Japan. | |

OTHER PUBLICATIONS

Kondo, "Effect of Heat Treatment on Silica Gel", Hymen, 14(8-9) 1976, pp. 419-426, abstract only.
Iler, R. K. The Chemistry of Silica, pp. 638-644 (1979).

Primary Examiner—Robert Kunemund
Attorney, Agent, or Firm—Cushman, Darby & Cushman

[57] ABSTRACT

A process for preparing silica having a low silanol content which comprises heating amorphous silica in an atmosphere of a low partial pressure of water vapor to maintain the amorphous silica at a temperature in a range of from 600° to 1000° C. at a first heating step and then maintain at a temperature of 1200° C. or more at a second heating step. The silica having a low silanol content obtained according to the present invention is advantageously used as a raw material for quartz glass, particularly as a raw material for preparing crucibles used to pull up silicon single crystals.

15 Claims, No Drawings

PROCESS FOR PREPARING SILICA HAVING A LOW SILANOL CONTENT

The present invention relates to a process for preparing silica having a low silanol content. More particularly, the present invention relates to a process for preparing amorphous silica substantially free of silanol group in a particulate form which comprises heating amorphous silica in an atmosphere of a low partial pressure of water vapor in two steps. Hereinafter the term "silica having a low silanol content" refers to amorphous silica substantially free of silanol groups.

The silica having a low silanol content obtained by the process of the present invention is advantageously used as a raw material for quartz glass, particularly as a raw material for preparing crucibles used to pull up silicon single crystals.

For preparing silicon single crystals, there are known the Czochralski method (CZ method) and the floating zone method and, the main current is currently the CZ method. The CZ method is a process for preparing cylindrical gigantic crystals which comprises immersing silicon single crystals in fused silicon, freshly forming single crystals on the crystal surface, and pulling up the crystals.

As a container for fusing silicon, a crucible made of quartz glass has been used. Quartz glass is the most suitable material as a crucible for pulling up silicon single crystals, since it is strongly resistant to thermal shock and can readily be highly purified.

In recent years, as super LSI has been highly integrated more and more, demand for purity of silicon chip has become severer. In response to the demand, the requirement for high purity of materials for preparing silicon-fusing crucibles has also become severer.

Natural crystals have been used heretofore as raw materials for crucible of this kind but natural crystals of good quality satisfying the requirement for high purity in these days are almost exhausted.

For this reason, it has been attempted to use synthetic amorphous silica in place of natural crystals.

However, synthetic silica generally has a high content of silanol groups, though it is highly pure. Thus, synthetic silica is inferior in heat resistance so that problems such as distortion of a crucible, etc. are caused in operation at high temperatures like silicon fusion. Under these circumstances, silica which can satisfy both high purity and heat resistance has been strongly desired.

Such requirements are met by amorphous silica which have a low content in impurities such as alkali metals, halogens, radioactive substances, etc., is highly pure and is substantially free of silanol groups.

In order to remove silanol groups from amorphous silica, the following methods are generally used:

1) a method which comprises heating amorphous silica in the air thereby accelerating dehydration of silanol groups (RALPH K. ILER, THE CHEMISTRY OF SILICA, 1979, P-638-644);

2) a method which comprises treating amorphous silica with a halogen gas (for example, Japanese Patent Application KOKOKU No. 56-28852); and the like.

However, the known methods involve the following problems.

Method 1) is simple and easily carried out but because of uncontrolled partial pressure of water vapor in the atmosphere for the treatment, silanol groups are poorly removed. The thus obtained silica is inferior in heat resistance and is not suitable as raw materials for preparing the crucibles.

Turning to Method 2), silanol groups can be almost completely removed but the method involves problems that:

a highly corrosive chlorine gas is used;

the removal of silanol groups should be followed by a treatment for removing halogen;

therefore, treatment steps are extremely complicated so that costs for the treatments are high; etc. Therefore, it is the actual situation that the method is not available in view of economic consideration, unless the method is used to prepare raw materials for producing products having highly added values, such as optical fibers, etc.

The present inventors have made investigations to solve the foregoing problems in the known methods and have found that by heating amorphous silica in two steps in an atmosphere of a low partial pressure of water vapor, amorphous silica substantially free of silanol groups can be obtained in a particulate form, without using any corrosive chemical, and have thus accomplished the present invention.

That is, the present invention is directed to a process for preparing silica having a low silanol content which comprises heating amorphous silica in an atmosphere of a low partial pressure of water vapor to maintain the amorphous silica at a temperature in a range of from 600° to 1000° C. at a first heating step and then maintain at a temperature of 1200° C. or more at a second heating step.

An object of the present invention is to provide amorphous silica substantially free of silanol groups in a particulate form, without using any corrosive chemical.

Other objects and advantages of the present invention will become apparent from the following descriptions.

The silanol groups contained in silica are present in various forms and the infrared absorption spectra thereof are attributable as follows:

| Wave number of Infrared Absorption ($cm^{-1}$) | Form of Silanol Group |
| --- | --- |
| 3740 | Lone silanol group |
| 3680 | Internal silanol group |
| 3400 | Silanol group derived from water adsorbed onto the surface |

Of these silanol groups, the silanol group derived from water adsorbed onto the surface can be relatively easily removed by a heat treatment. Accordingly, what is taken into account in the treatment for rendering the silanol content low is to remove the internal silanol group and the lone silanol group.

The present invention relates to a process for removing not only the silanol group derived from water adsorbed onto the surface but also particularly the internal silanol group and the lone silanol group.

According to the present invention, concentrations of the silanol groups can be respectively reduced to the following ranges represented using an absorbance value Δ, measured according to a diffuse reflection method, which value is a difference between an infrared absorbance at each of the peak positions and an infrared absorbance on the base line, as an index of a concentration of each silanol group:

| Wave number of Infrared Absorption (cm$^{-1}$) | Absorbance Value Δ |
| --- | --- |
| 3740 | 0.005 or less |
| 3680 | 0.09 or less |
| 3400 | 0.005 or less |

In the present invention, the silica having a low silanol content is specifically amorphous silica containing the lone silanol group, the internal silanol group and the silanol group derived from water adsorbed onto the surface respectively in concentrations represented by the above-mentioned absorbance values Δ. Incidentally, the above concentration of the internal silanol group comes to 120 ppm or less in parts per million of —OH group.

The present invention comprises a first heating step and a second heating step.

At the first heating step, amorphous silica is heated in an atmosphere of a low partial pressure of water vapor to maintain the amorphous silica at a temperature in a range of from 600° to 1000° C., whereby most of the internal silanol group can be removed.

At the second heating step, the silica from which most of the internal silanol group has already been removed is heated in an atmosphere of a low partial pressure of water vapor to maintain the silica at a temperature of 1200° C. or higher, whereby the lone silanol group can be removed.

Hereafter the respective steps described above are explained below.

First Heating Step (Removal of Internal Silanol Group)

In general, a chance that silanol groups are bound to each other and water molecules are eliminated increases as a temperature becomes high. Merely by keeping the temperature high, however, the degree of removing silanol groups does not increase.

Silica particles can maintain their small pores at a temperature 1000° C. or less and in order to remove the internal silanol group, a temperature is preferably 600° C. or higher. It is also possible to remove the internal silanol group at a temperature below 600° C. but the effect is relatively small. On the other hand, at a temperature exceeding 1000° C., the small pores are closed and the effect of removing the internal silanol group decreases.

According to the present invention, raw silica is heated to keep it at a temperature in a range of 600° to 1000° C., preferably 900° to 1000° C. Thus the internal silanol group is mainly removed.

In removal of the silanol groups contained in the inside of silica, it is necessary that water molecules eliminated by dehydration diffuses from the inside of silica particles into the outside thereof. Accordingly, where a distance for the diffusion is long, it is highly likely that the water once eliminated would react with silica within the particles to form silanol groups again. Therefore, in order to remove the internal silanol group, it is desired to use, as a raw material, silica particles having as small a particle size as possible and a large specific surface area and rich of small pores.

As for the amorphous silica used as a raw material in the present invention, it is desired to use amorphous silica having a particle size of 1 mm or less and a specific surface area according to a BET method (hereinafter referred to as specific surface area, simply) of 100 m$^2$/g or more.

Such silica can be obtained by the processes previously proposed by the present inventors, for example, the processes recited in Japanese Patent Application KOKAI Nos. 62-3011, 62-3012, 62-283809 and 62-283810, in which an aqueous solution of sodium silicate (water glass JIS No. 3) is subjected to wet shaping, the resulting silica is dried and the dry powders thereof are ground and classified.

Furthermore, as the amorphous silica, there may also be used those obtained by grinding dry powders of organic silica obtained by subjecting an alkoxide such as methyl silicate or ethyl silicate to wet shaping into powders followed by classification.

A particle size of the amorphous silica used as the raw material is in a range of 1 mm or less, preferably 0.4 mm or less, more preferably from 0.05 to 0.3 mm. For removing silanol groups from silica, it is preferred to use silica having a small particle size. However, silica having a particle size of less than 0.05 mm increases its adherence and reduces its fluidity to cause difficulty in shaping. It is thus difficult to use such silica as a raw material for preparing crucibles. On the other hand, in the case of silica particles having a particle size of 1 mm or more, the diffusion distance of water molecule eliminated by dehydration becomes large so that many silanol groups remain inside the silica.

A specific surface area of the amorphous silica used as a raw material is in a range of 100 m$^2$/g or more, preferably 200 m$^2$/g or more, more preferably from 500 to 1000 m$^2$/g. The silica having a specific surface area of less than 100 m$^2$/g has a small number of pores and its final degree of removing silanol groups is small. Such silica is not preferred. The larger a specific surface area does a raw silica has, the more it is preferable. However, it is extremely difficult to obtain silica having a specific surface area exceeding 1000 m$^2$/g.

On the other hand, in case a temperature is high but a partial pressure of water vapor is high in an atmosphere, a rate of dehydration increases and at the same time, the rate of hydration also increases. It is considered that the final concentration of silanol groups in silica would be determined in such a region that the rate of hydration and that of dehydration are balanced.

In order to retard the rate of hydration, an atmosphere of a low partial pressure of water vapor is chosen at both the first heating step and the second heating step in the present invention, with respect to an atmosphere for the treatment of removing silanol groups.

As an atmosphere of a low partial pressure of water vapor, there are mentioned media showing a low dew point and inert to silica, such as dry air, an inert gas, e.g., N$_2$, Ar, He, etc., and the like. However, careful attention should be paid to N$_2$, since raw silica or materials used in treatment apparatuses might be nitrogenized in a high temperature region.

By flowing such a medium, water eliminated from silica is also effectively removed. A dew point of a medium used is $-50°$ C. or less, preferably $-70°$ C. or less.

In the present invention, an atmosphere of a low partial pressure of water vapor may be a vacuum, which is also effective. The treatment in a vacuum of a pressure $1 \times 10^{-2}$ Torr or less is effective for reducing the silanol content.

As stated above, the rate of removing silanol groups is affected by factors such as temperature upon treatment, partial pressure of water vapor in the atmosphere, a diffusion rate of water molecule eliminated from the silanol groups in the inside of silica to the outside, etc.

A treatment time at this step is preferably as long as possible in a range of from 1 to 10 hours. Since particle pores close when a treatment time is too long, a treatment for over 10 hours does not contribute to further removal of the silanol groups. In case the treating time is shorter than an hour, the effect of removing the internal silanol group is relatively small.

Second Heating Step (Removal of Lone Silanol Group)

At this step, the lone silanol group is mainly removed. From the silica obtained after the first heating step, most of the internal silanol group is removed but the lone silanol group on the surface of the particles still remains.

In case that the lone silanol group is also wished to be removed, a higher temperature for the treatment than at the first heating step for mainly removing the internal silanol group is required. It is necessary that the raw amorphous silica is maintained at a temperature of 1200° C. or higher in an atmosphere of a low partial pressure of water vapor as in the first heating step. By keeping the raw amorphous silica in a temperature of 1200° C. or higher, the lone silanol group can be almost completely removed.

At this step, it is advantageous to perform the treatment at such a temperature as high as possible. However, in a temperature exceeding 1300° C., silica particles are sintered to each other and such a temperature is not preferred. It is possible to grind the formed sintered product into powders and regulate its grain size again. In this case, however, the treating steps become complicated and at the same time, the surface of silica particles freshly formed by the grinding treatment has activity, and a hydration reaction proceeds on the surface due to absorption of water so that the concentration of silanol groups increases, which is not preferred.

A treatment time is chosen in the range in that no sintering causes, genereally in a range of from 20 minutes to 10 hours, preferably in a range of from 30 minutes to 5 hours.

According to the present invention, dense amorphous silica particles having an extremely low concentration of silanol groups and having a controlled particle size can be obtained.

The silica particles having a low silanol content which are obtained according to the present invention have a low concentration of silanol groups as compared to those obtained by the known methods. In addition, the silica particles have a controlled particle size distribution without performing any grinding treatment. Therefore, the silica particles can be advantageously used as raw materials for preparing transparent quartz glass, particularly for preparing crucibles for pulling up silicon single crystals.

Furthermore, the present invention also possesses the advantage that production cost can be reduced, as compared to the case of the known methods.

The present invention is described in more detail by referring to Examples and Comparative Examples. The present invention should not, however, be construed to be restricted by the Examples.

EXAMPLE 1

Dry powders of silica obtained by subjecting an aqueous sodium silicate solution (water glass, JIS No. 3) to wet shaping were ground into powders and then classified. The thus obtained dry amorphous silica powders having a specific surface area of 821 m²/g and a particle size range of from 74 to 147 μm or from 147 to 400 μm were used as raw materials.

The impurities contents of the raw silica were Al<1 ppm, Ti<1 ppm and each of alkali metal elements<1 ppm. The silica also contained 8 wt % of water.

The raw silica powders classified into respective particle sizes were charged by 5 g each in a quartz glass-made beaker of 100 ml and heated in a furnace in a vacuum of a pressure of $1 \times 10^{-4}$ Torr. After keeping them at 900° C. for 10 hours (first heating step), a furnace temperature was elevated to 1250° C. and kept at the same temperature for further 5 hours (second heating step).

The silica powders obtained after the heat treatments were all amorphous in a particulate form.

With respect to each of the raw silica and silica obtained after the heat treatments, infrared absorption spectrum was determined by the diffuse reflection method using a Fourier transfer infrared spectrometer (Perkin-Elmer Model No. 1710).

Where the silanol group derived from water adsorbed onto the surface, the internal silanol group and the lone silanol group were present, their infrared absorptions were noted at a wavenumber of 3400 cm$^{-1}$, 3680 cm$^{-1}$ and 3740 cm$^{-1}$, respectively. Using an absorbance value Δ which is a difference between the absorbance at each of the peak positions and the absorbance on the base line as an index of a concentration of each silanol group, the thus obtained results are shown in Table 1.

TABLE 1

| Run No. | Particle Size Range (μm) | Heating Treatment | Absorbance Value Δ | |
|---|---|---|---|---|
| | | | 3680 cm$^{-1}$ | 3740 cm$^{-1}$ |
| 1-1 | 74–147 | before | about 1* | |
| | | after | 0.007 | no absorption |
| 1-2 | 147–400 | before | about 1* | |
| | | after | 0.030 | no absorption |

Note: *In an infrared absorption by three silanol groups of the raw silica before the heat treatments, 3 peaks were not isolated but showed a broad peak.

In any of these runs and the following runs, any infrared absorption was not noted in the heat-treated silica at a wavenumber of 3400 cm$^{-1}$ indicating that the silanol group derived from water adsorbed onto the surface did not remain.

EXAMPLE 2 and COMPARATIVE EXAMPLE 1

The raw amorphous silica having a particle size range of from 147 to 400 μm used in Example 1 was treated at the same steps as in Example 1, except that the runs were carried out under various degrees of vacuum.

The silica powders obtained after the heat treatments were all amorphous in a particulate form.

The results of infrared absorption determined in the same manner as in Example 1 are shown in Table 2, together with the results obtained in Example 1.

TABLE 2

| | Run No. | Degree of Vacuum (Torr) | Absorbance Value Δ | |
|---|---|---|---|---|
| | | | 3680 cm$^{-1}$ | 3740 cm$^{-1}$ |
| EXAMPLE 1 | 1-2 | $1 \times 10^{-4}$ | 0.030 | no absorption |
| EXAMPLE 2 | 2-1 | $1 \times 10^{-3}$ | 0.032 | no absorption |
| | 2-2 | $1 \times 10^{-2}$ | 0.041 | no absorption |
| COMPAR- | 1-1 | $1 \times 10^{-1}$ | 0.122 | no absorption |

TABLE 2-continued

| Run No. | Degree of Vacuum (Torr) | Absorbance Value Δ | |
|---|---|---|---|
| | | 3680 cm$^{-1}$ | 3740 cm$^{-1}$ |
| ATIVE EXAMPLE 1 | 1-2 Air under normal pressure | 0.235 | no absorption |

EXAMPLE 3 and COMPARATIVE EXAMPLE 2

The raw amorphous silica of the same lot as used in Example 2 was treated under the same conditions as in Example 1, except that the conditions for the first heating step were changed with respect to temperature and time as shown in Table 3.

Furthermore, the case in which a temperature was elevated to 1250° C. at an elevation rate of 500° C./h instead of the treatment at the first heating step in Example 1 and the temperature was kept for 5 hours is shown as Comparative Example 2. The silica powders obtained after the heat treatments were all amorphous in a particulate form.

The results of infrared absorption determined in the same manner as in Example 1 are shown in Table 3, together with the results obtained in Example 1.

TABLE 3

| | Run No. | First Heating Step | | Absorbance Value Δ | |
|---|---|---|---|---|---|
| | | Temp. (°C.) | Time (hr.) | 3680 cm$^{-1}$ | 3740 cm$^{-1}$ |
| EXAMPLE 3 | 3-1 | 600 | 10 | 0.048 | no absorption |
| | 3-2 | 800 | 10 | 0.039 | no absorption |
| | 3-3 | 900 | 2 | 0.045 | no absorption |
| | 3-4 | 900 | 5 | 0.035 | no absorption |
| EXAMPLE 1 | 1-2 | 900 | 10 | 0.030 | no absorption |
| COMPARATIVE EXAMPLE 2 | 2-1 | 1250 | 5 | 0.100 | no absorption |

EXAMPLE 4 and COMPARATIVE EXAMPLE 3

The raw amorphous silica of the same lot as used in Example 2 was treated under the same conditions as in Example 1, except that the conditions for the second heating step were changed with respect to temperature and time as shown in Table 4.

Furthermore, the case in which the treating temperature at the second heating step was lower than 1200° C. is shown as Comparative Example 3. The silica powders obtained after the heat treatments were all amorphous in a particulate form.

The results of infrared absorption determined in the same manner as in Example 1 are shown in Table 4.

TABLE 4

| | Run No. | Second Heating Step | | Absorbance Value Δ | |
|---|---|---|---|---|---|
| | | Temp. (°C.) | Time (hr.) | 3680 cm$^{-1}$ | 3740 cm$^{-1}$ |
| EXAMPLE 4 | 4-1 | 1200 | 5 | 0.041 | no absorption |
| | 4-2 | 1250 | 2 | 0.038 | no absorption |
| | 4-3 | 1300 | 5 | 0.029 | no absorption |
| EXAMPLE 1 | 1-2 | 1250 | 5 | 0.030 | no absorption |
| COMPARATIVE EXAMPLE 3 | 3-1 | 1100 | 5 | 0.091 | 0.041 |

EXAMPLE 5

The raw amorphous silica (particle size range: 147–400 μm) of the same lot as used in Example 1 was heat-treated in the same manner as in Example 1, except that the treatments were carried out under normal pressure using media shown in Table 5.

The dew points of the media used were all approximately −70° C. and the partial pressure of water vapor was about 2×10$^{-3}$ Torr. The silica powders obtained after the heat treatments were all amorphous in a particulate form.

The results of infrared absorption determined in the same manner as in Example 1 are shown in Table 5.

TABLE 5

| | Run No. | Atmosphere Kind of Medium | Absorbance Value Δ | |
|---|---|---|---|---|
| | | | 3680 cm$^{-1}$ | 3740 cm$^{-1}$ |
| EXAMPLE 5 | 5-1 | Nitrogen | 0.038 | no absorption |
| | 5-2 | Argon | 0.035 | no absorption |
| | 5-3 | Helium | 0.030 | no absorption |

EXAMPLE 6

Organic silica products obtained by subjecting methyl silicate and ethyl silicate to wet shaping were heated to a temperature of 500° C. for 5 hours, respectively. The obtained silica particles were ground into powders and then were classified to give amorphous silica powders having a particle size range of from 147 to 400 μm and specific surface areas of 623 m$^2$/g and 585 m$^2$/g, respectively. These amorphous silica particles contained impurities of Al, Ti and alkali metals each of 1 ppm or less, respectively.

Each of these amorphous silica was heat-treated in the same manner as in Example 1 to give particulate amorphous silica in any runs.

With respect to each of silica before and after the heat treatments, infrared absorption spectrum was determined in the same manner as in Example 1. The results obtained are shown in Table 6.

TABLE 6

| Run No. | Organic Silica | Heating Treatment | Absorbance Value Δ | |
|---|---|---|---|---|
| | | | 3680 cm$^{-1}$ | 3740 cm$^{-1}$ |
| 6-1 | methyl silicate | before | | about 1* |
| | | after | 0.035 | no absorption |
| 6-1 | ethyl silicate | before | | about 1* |
| | | after | 0.039 | no absorption |

Note: *In an infrared absorption by three silanol groups of the raw silica before the heat treatments, 3 peaks were not isolated but showed a broad peak.

Any infrared absorption at a wavenumber of 3400 cm$^{-1}$ was not noted in the heat-treated silica in any of the runs, indicating that the silanol group derived from water adsorbed onto the surface did not remain.

What is claimed is:

1. A process for preparing amorphous silica which comprises heating amorphous silica, in at least one atmosphere selected from the group consisting of dry air, inert gases and vacuum, said atmosphere having a dew point of −50° C. or less to maintain the amorphous silica at a temperature in a range of not less than 600° C. but less than 1000° C. at a first heating step and then, without cooling the amorphous silica, heating it to maintain it at a temperature of 1200° C. or more, in an atmosphere of a low partial pressure of water vapor, at a second heating step.

2. A process for preparing silica according to claim 1, wherein the silica is amorphous in a particulate form.

3. A process for preparing silica according to claim 1, wherein a particle size of the amorphous silica is 1 mm or less.

4. A process for preparing silica according to claim 1, wherein a particle size of the amorphous silica is 0.4 mm or less.

5. A process for preparing silica according to claim 1, wherein a particle size of the amorphous silica is in a range of from 0.05 to 0.3 mm.

6. A process for preparing silica according to any of claim 1, wherein a specific surface area of the amorphous silica is 100 m$^2$/g or more.

7. A process for preparing silica according to claim 1, wherein a specific surface area of the amorphous silica is 200 m$^2$/g or more.

8. A process for preparing silica having a low silanol content according to claim 1, wherein a specific surface area of the amorphous silica is in a range of from 500 to 1000 m$^2$/g.

9. A process for preparing amorpous silica having a low silanol content according to claim 1, wherein the amorphous silica is maintained at a temperature in a range of not less than 900° C. but less than 1000° C. at the first heating step.

10. A process for preparing silica according to claim 1, wherein the amorphous silica is maintained at a temperature in a range of from 1200° to 1300° C. at the second heating step.

11. A process for preparing silica according to claim 1, wherein the atmosphere is at least one selected from the group consisting of air, nitrogen, argon and helium.

12. A process for preparing silica according to claim 1, wherein the atmosphere is at least one selected from the group consisting of air, nitrogen, argon and helium and said atmosphere has a dew point of $-70°$ C. or less.

13. A process for preparing silica according to claim 1, wherein the atmosphere is a vacuum of a pressure of $1 \times 10^{-2}$ Torr or less.

14. A process for preparing amorphous silica which comprises heating amorphous silica in at least one atmosphere selected from the group consisting of dry air, inert gases and vacuum and having a dew point of $-50°$ C. or less to maintain the amorphous silica at a temperature in a range of not less than 600° C. but less than 1000° C. at a first heating step and then maintain at a temperature of 1200° C. or more, in an atmosphere of a low partial pressure of water vapor, at a second heating step, thereby reducing concentrations of lone silanol groups, internal silanol groups and silanol groups derived from water absorbed onto the surface to the absorbance values of 0.005 or less at 3740 cm$^{-1}$, 0.09 or less at 3680 cm$^{-1}$ and 0.005 or less at 3400 cm$^{-1}$, respectively, which absorbance value is defined as a difference between an infrared absorbance at each of the above peak positions and an infrared absorbance on the base line.

15. A process for preparing silica according to any one of claims 1–8 and 9–14, wherein treatment time at the first step is in a range of from 1 to 10 hours.

* * * * *